United States Patent [19]

Weiner

[11] Patent Number: 4,537,482
[45] Date of Patent: Aug. 27, 1985

[54] MOTION PICTURE FILM MOVEMENT APPARATUS

[76] Inventor: Lewis Weiner, 8708 Santiago St., Holliswood, N.Y. 11423

[21] Appl. No.: 566,665

[22] Filed: Dec. 29, 1983

[51] Int. Cl.³ .............................................. G03B 1/24
[52] U.S. Cl. ................................... 352/186; 352/184; 226/143
[58] Field of Search ............... 352/184, 185, 186, 190; 226/143

[56] References Cited

U.S. PATENT DOCUMENTS 704,449  7/1902  Edwards ........................... 352/185

FOREIGN PATENT DOCUMENTS 559446  12/1923  France ............................. 352/186
580352  11/1924  France ............................. 352/186
412921   3/1946  Italy ................................... 352/195

Primary Examiner—Monroe H. Hayes
Attorney, Agent, or Firm—Ralph B. Pastoriza

[57] ABSTRACT

A captive film loop apparatus moves film through a film gate in a manner to increase the dwell time of each film frame in the gate over that normally available with presently known captive film loop apparatus. Film loops on either side of the gate are held captive by first and second rollers which are moved in unison along a given path for a first given period during which the first roller takes up all film fed to it and the second roller releases all film taken from it. The rollers are then moved in unison along a return path to their original positions during a second given period substantially less than the first given period. Film in the film gate is stationary during the first given period and moved through the gate from one frame to the next within the second given period. The construction is such as to provide for a very smooth acceleration and deceleration of the film so that rapid projection of large film formats is possible without damaging the film perforations.

12 Claims, 12 Drawing Figures

MOTION PICTURE FILM MOVEMENT APPARATUS

FIELD OF THE INVENTION

This invention relates generally to motion pictures and more particularly to an improved motion picture projector, particularly useful for projection of large film frame formats.

BACKGROUND OF THE INVENTION

There is a present day need in motion picture projectors used in theatres for providing a very fast pull down or transport of the film with an accompanying long dwell period, preferably 270° over a 360° cycle. In conventional motion picture theatre projectors, the old proven Geneva movement is presently used for intermittently moving appropriate pull down sprockets. While these movements have great reliability, the Geneva movement itself has a somewhat abrupt acceleration and deceleration characteristic, which imparts cumulative stresses on both the film, film sprockets and other mechanism. Moreover, the strong vibrations of free or unsupported film loops associated with conventional film movements cause noise and instabilities which become increasingly objectionable with larger film formats.

It is recognized, that if projection equipment can be provided which avoids these problems, film copies can be run more often in theatres and substantial savings will result.

In the past there have been a number of proposed constructions for eliminating free loops in motion picture equipment. Essentially, these systems have captive loops which have a number of benefits to be described subsequently. However, the systems have shortcomings when applied to motion picture projector uses. Interjected spring-loaded members to hold the film loops captive have proven unreliable and introduce other problems.

The problem has been recognized for some time as evidenced by U.S. Pat. Nos. 629,582 issued July 25, 1899; 704,449 issued July 8, 1902, and 2,039,906 issued May 5, 1936. These three prior art patents are examples of captive loop constructions, but the features therein have not been carried sufficiently forward to provide a practical and workable system. For example, adequate motion control systems are not evident that will assure a complete captive loop operation throughout an entire cycle. Further, long dwell times have not been achievable with these prior art systems. A more recent U.S. Pat. No. 3,613,978, issued Oct. 19, 1971 provides for a properly captive film but a dwell time of only one-fourth the entire cycle. Such known systems are not suitable for use in projection equipment requiring long dwell periods of up to or even greater than 270°.

BRIEF DESCRIPTION OF THE PRESENT INVENTION

The present invention provides a captive film loop apparatus particularly useful for very large film formats utilizing correspondingly large film loops wherein the construction is designed to provide for a very gentle acceleration and deceleration of the film without sacrificing the time of the dwell period. There is thus eliminated abrupt intermittent action by sprocket teeth in the film perforations. Moreover, such kindness to the film and smoothness of the drive increases the life of the film and the equipment substantially. It further makes it possible to provide projection systems with very large formats by eliminating the associated large free unsupported loops which otherwise would cause a considerable disturbance through noise and vibrations, which in turn result in instabilities of the projected image.

In its broadest aspect, the present invention includes first and second rollers together with means for feeding film to the first roller and taking up film from the second roller. It will be understood that the speed of feeding the film and taking up the film is constant since the film is supplied by a continuously constantly rotating sprocket and taken up by a constantly rotating sprocket. Further means are provided for moving the first and second rollers in unison along a given path for a first given period during which the first roller takes up all film fed to it and the second roller releases all film taken from it and for moving the first and second rollers in unison along a return path to their original positions during a second given period less than the first given period. As a consequence the film in the film gate is stationary during the first given period and moved through the gate from one frame to the next only within the second given period.

The acceleration of the rollers at the beginning of the second given period and the deceleration of the rollers at the end of the second given period is effected in a very smooth manner to thereby relieve stresses on the film perforations and materially increase the overall life of the film as well as the projection equipment.

BRIEF DESCRIPTION OF THE DRAWINGS

A better understanding of this invention will be had by now referring to the accompanying drawings in which.

DETAILED DESCRIPTION OF THE INVENTION

Figure 1:
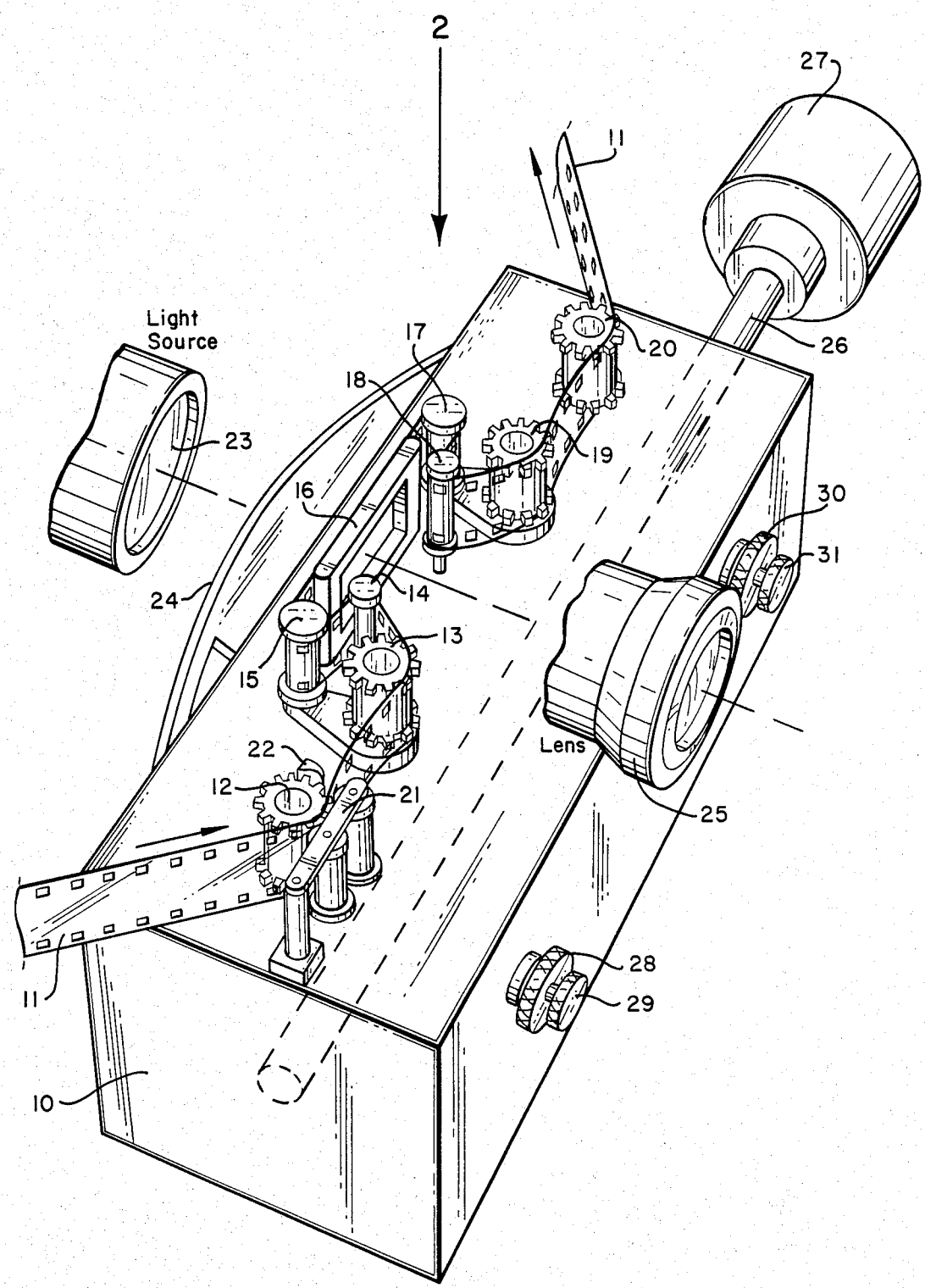
FIG. 1 is an overall perspective view of the basic projection system with portions broken away to avoid obscuring other components of the system.

Referring to FIG. 1, the apparatus comprises a main casing or housing 10 and in the preferred embodiment, the system is oriented horizontally. Film 11 is pulled from a payout reel (not shown) by a separation sprocket 12 which is rotated at a constant speed.

Film 11 then passes from the sprocket 12 to a first sprocket 13, there being provided a "loose" length of film between the sprockets 12 and 13. Sprocket 13 is rotated at exactly the same rate as sprocket 12. By providing the "loose" length of film between the sprocket 12 and sprocket 13, it is assured that the teeth of sprocket 13 will always engage the trailing edges of the film perforations to effect a very uniform feeding of the film from the sprocket 13.

Still following the film path as shown in FIG. 1, the film from the first sprocket 13 passes around a first stationary guide roller 14 and thence about a first movable roller 15. From the roller 15, the film passes through the film gate 16 and about a second movable roller 17. From roller 17, the film then passes about a second stationary guide roller 18 about a take-up or second sprocket 19. From the second sprocket 19, the film passes to a separation sprocket 20 there again being provided a "loose" length of film between the sprocket 19 and sprocket 20. From the sprocket 20, the film 11 passes to a take-up reel (not shown). The loose length of film between the sprockets 19 and 20 serves a similar function as described with respect to the sprockets 12 and 13; that is, it assures that the sprockets on the take-up sprocket 19 engage only the leading edges of the film perforations so that the taking up of the film from the second stationary guide roller 18 and second roller 17 is uniform.

It will be understood in FIG. 1 that all of the sprockets 12, 13, 19 and 20 are provided with appropriate keepers and film strippers. A typical such keeper is shown at 21 for the separation sprocket 12 and the stripper portion is shown at 22. The keepers and strippers for the remaining sprockets are not shown in order to avoid obscuring other components of the drawing. It will be understood that the stripper 22 functions to prevent inadvertent winding up of the film on the sprocket 12 should the film end passing the sprocket break. The same function is carried out by the other strippers.

Behind the gate 16 as indicated schematically in FIG. 1 is an appropriate light source 23, there being interposed a shutter 24. The projection lens is shown in fragmentary view at 25 in front of the gate 16.

The various sprockets 12, 13, 19 and 20 are all driven at uniform constant rates by a main shaft 26 driven by motor 27 entering the casing or housing 10 at the far end as viewed in FIG. 1.

Shown extending from the front portion of the housing are film position adjusting means 28 with a cooperating locking knob 29 permitting slight rotation of the sprockets 12 and 13 without having to rotate the drive shaft 26. A similar film positioning means for the sprockets 19 and 20 are indicated at 30 with a locking knob 31.

Figure 2:
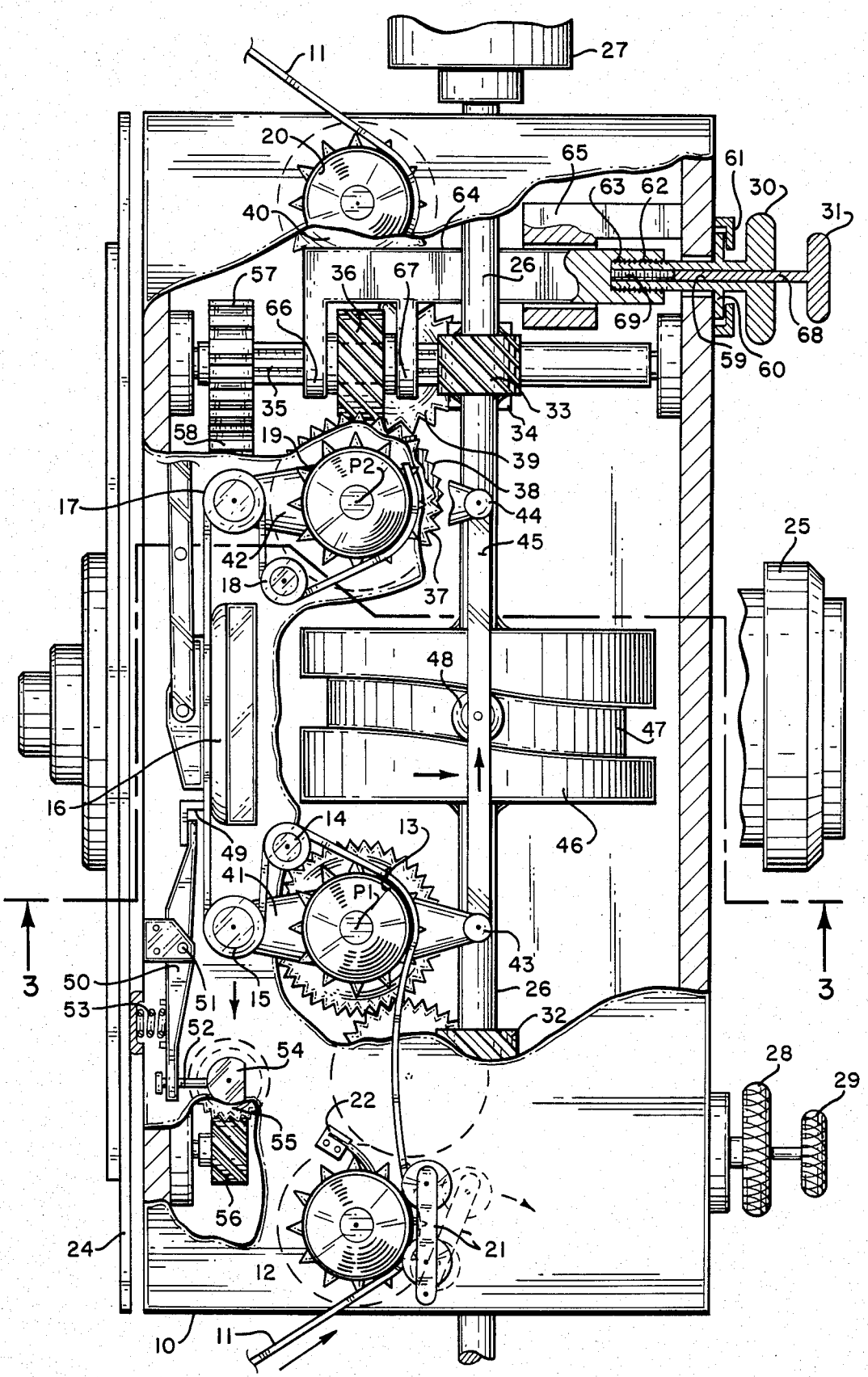
FIG. 2 is a top plan view of the apparatus looking in the direction of the arrow 2 of FIG. 1.

The foregoing as well as many further features and advantages of the present invention will be better understood by now referring to the broken away plan view of FIG. 2. As shown in the lower central portion, the drive shaft 26 carries a first helical drive gear 32 and, as shown in the upper portion of FIG. 2, a second helical drive gear 33. Gears 32 and 33 are rotated simultaneously by the shaft 26 and are respectively coupled to the first and second sprockets 13 and 19 to rotate these sprockets at a constant rate. The coupling of the drive gears 32 and 33 to the sprockets as well as the operation of the film positioning knobs 28 and 30 and associated lock knobs 29 and 31 are identical and therefore a detailed description of one will suffice for both.

Figure 3:
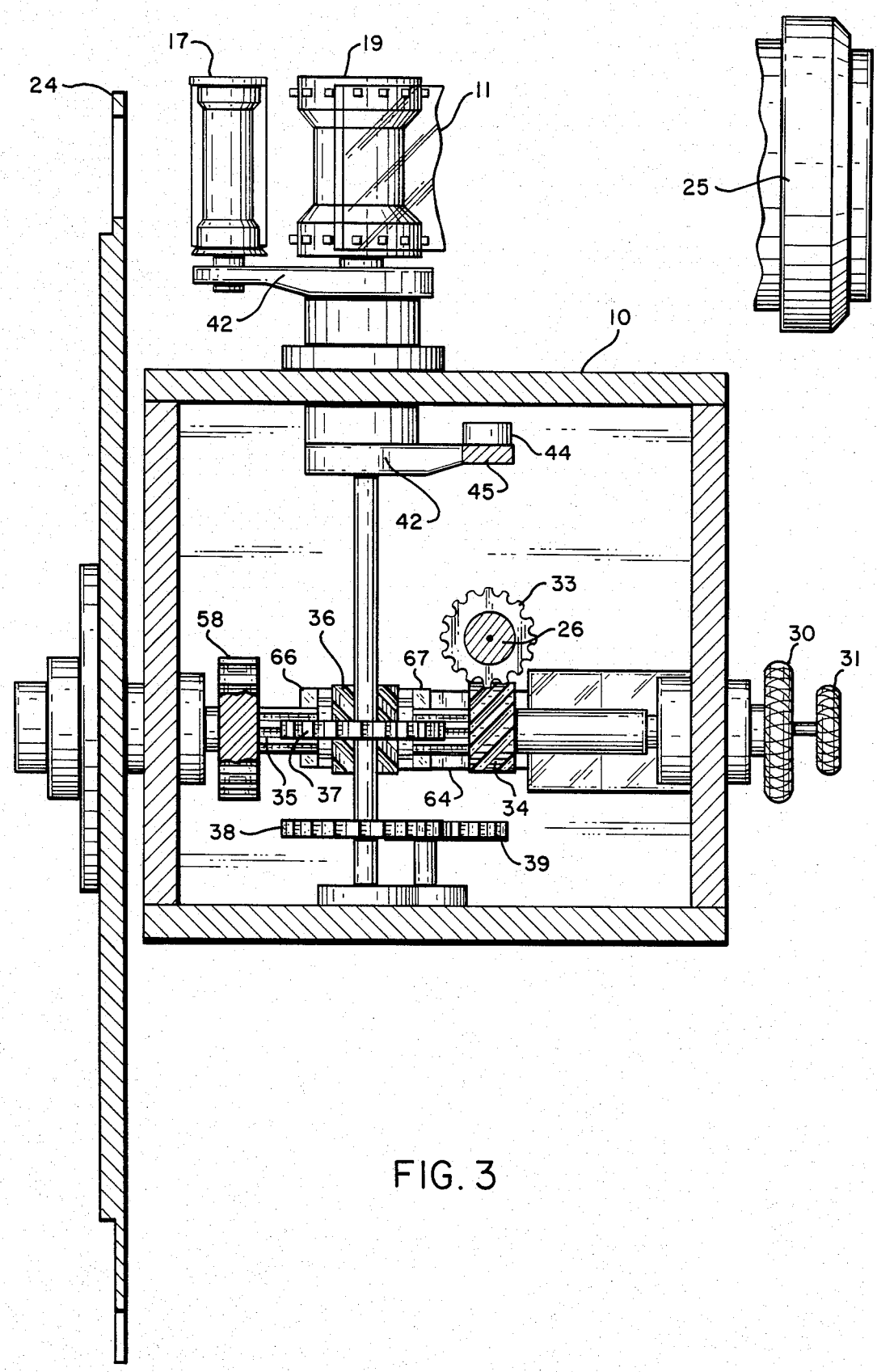
FIG. 3 is a sectional view taken along the section line 3—3 of FIG. 1.

As best seen in both FIGS. 2 and 3, the upper helical drive gear 33 of FIG. 2 meshes with another helical drive gear 34 mounted on a splined shaft 35. Splined shaft 35 carries another helical gear 36 capable of translational movement along the shaft 35. Gear 36 meshes with a sprocket gear 37 associated with the sprocket 19. Coaxial with the sprocket gear 37 is a further gear 38 on the same sprocket shaft meshing with an idler gear 39 in turn meshing with a sprocket gear 40 for the separation sprocket 20.

From the foregoing it will be evident that when the shaft 26 rotates to rotate the helical gear 33, the motion will be transmitted through helical gear 34 and splined shaft 35 to helical gear 36. Rotation of helical gear 36 in turn will then rotate the sprocket 19 by way of gear 37 and also the sprocket 20 at an identical rate by way of the lower gear 38, idler gear 39 and sprocket gear 40. The first sprocket gear 13 is similarly driven by way of a corresponding chain of gears from the helical gear 32 on shaft 26.

The shafts for the first and second sprocket gears 13 and 19 have axes defining first and second pivot points P1 and P2 for roller support means in the form of arms 41 and 42. The first and second rollers 15 and 17 ar rotatably mounted to the extending ends of the arms 41 and 42, the opposite ends on the other side of the pivot points P1 and P2 shown at 43 and 44, respectively, connect to a link 45.

With the foregoing construction, pivoting of the arms 41 and 42 about the pivot points P1 and P2 coincident with the axes of the first and second sprockets 13 and 19 will result in the rollers 15 and 17 rocking back and forth along arcuate paths. Appropriate means for moving the first and second rollers in unison includes a rotatable member in the form of a drum 46 having a camming means in the form of a channel 47 cut in the periphery of the drum for receiving a cam follower 48 on the central underside of the link 45 constituting part of the roller support means.

The drum 46 is secured to the shaft 26 for direct rotation by this shaft. By cutting the channel 47 so as to follow a specified path, the cam follower 48 will be caused to move back and forth for each complete revolution of the drum so that the rollers will move in a repetitive pattern.

As a specific example, there is shown on the drum 46 an arrow indicating that the top part being viewed is moving to the right resulting in an upward movement of the cam follower 48 and link 45. This motion will impart a downward movement to the rollers 15 and 17 as also indicated by the arrow in FIG. 2. The roller 15 will thus be taking up film fed to it by the first sprocket 13 while the second sprocket 19 will be taking up film released by the second roller 17 as a consequence of the downward movement. By appropriately adjusting the rate of movement of the rollers by adjustment of the pitch of the camming channel, the first roller 15 will take up all film fed to it by the first sprocket 13 and the second roller 17 will release all film taken from it by the second sprocket 19. As a result, the portion of the film in the gate 16 will be stationary and will constitute the dwell time of the film in the gate.

When the direction of the rollers reverses so as to move along a return path to their original positions, the film in the gate will be transported from one frame to the next, all as will become clearer as the description proceeds.

During the dwell time, it is important to assure a consistent positioning of the film in the gate 16 and towards this end there are provided registration pin means such as indicated at 49 adjacent to the edge of the gate 16 in FIG. 2. Registration pins 49 are carried on one end of an arm 50 pivoted at 51. The oppositely extending end of the arm 50, in turn, carries a positioning screw 52 biased by spring 53 into engagement with a cam wheel 54. Cam wheel 54 is rotated by way of cam wheel gear 55 meshing with helical gear 56. Helical gear 56 is driven by an appropriate gear train (not shown) from drive gear 32 on shaft 26.

It will be understood that when the film is to be transported from one frame to the next, the registration pin means 49 are removed from the film perforations and that when the film is in its dwell position, the registration means re-enter the film perforations for consistent indexing.

During the dwell period referred to above, the shutter 24 is moved to an open position and operation of the shutter can be effected through an appropriate gear train part of which is shown at 57 and 58 in the upper left portion of FIG. 2. Thus, the gear 57 rotates with the splined shaft 35 to rotate a gear 58 in turn coupled to rotate the shutter 24.

In order to assure that the film is properly positioned in the film gate 16 during the dwell period so that the film perforations will receive the registration pin means 49, the film adjustment means briefly referred to heretofore associated with the knobs 28 and 30 and locking knobs 29 and 31 can be used. This film positioning means also permits adjustment of the length of film extending between the first and second sprockets 13 and 19 so that in a sense the tension on the film can be appropriately adjusted. Basically, the film positioning means will permit slight rotations of the sprockets 13 and/or 19 independently of any movement of the shaft 26 and drum 46 so that the rollers will remain in an unchanged relative position with respect to the drum while such movements of the sprockets are effected. Since the adjustment means associated with the sprockets 13 and 19 are identical, a detailed description of one will suffice.

Thus, referring once again to the upper portion of FIG. 2, it will be noted that the film adjusting knob 30 includes a hollow shaft 59 having an exterior annular flange 60 rotatable within an annular overlying flange 61. This arrangement permits rotational movement of the hollow shaft 59 by the knob 30 and prevents any inward or outward movement of the shaft in the side of the housing.

The exterior end of the hollow shaft 59 terminates in threads 62 threadedly received in a tapped bore 63 formed on one end of a carriage 64. It will be appreciated that when the knob 30 is rotated to thread the thread 62 in the tapped opening 63, the carriage 64 will be translated to the right or left depending on the rotational direction of the knob 30 as viewed in FIG. 2. Movement of the carriage 64 is guided by guide block 65. The carriage itself includes yoke arms 66 and 67 straddling the gear 36 mounted on the splined shaft 35.

With the foregoing arrangement, it will be seen that when the carriage 64 is moved to the right or left as viewed in FIG. 2, the gear 36 is caused to move along the splined shaft 35 and because of its helical engagement with the sprocket gear 37 for the sprocket 19, a slight rotation of the sprocket will take place with translational movement of the gear 36. This rotation of the sprocket 19 will be wholly independent of any rotation of the shaft 26 or drive gear 33 and thus will be wholly independent of the rotation of the drum 46 and the position of the cam follower 48.

As an example, if it is assumed that the helical gear 36 is translated to the right by movement of the carriage 64 to the right upon rotation of the knob 30, this motion will impart a clockwise rotation to the sprocket gear 37 rotating the sprocket 19 in a clockwise direction as viewed in FIG. 2 to thereby increase the length of film between the sprocket 19 and sprocket 13. By now making a similar adjustment by rotating the knob 28 for the film positioning system associated with the sprocket 13, this extra length of film can be taken up without any movement of the rollers taking place so that the positioning of the film in the gate 16 can be changed for proper registration of its perforations with the registration pin means 49.

In order to lock the adjusted position of the carriage 64 after an appropriate adjustment has been made, the locking knob 31 is rotated. As shown, the knob 31 has a shaft 68 extending into the hollow shaft 59 for the film adjustment knob 30. The end of shaft 68 is threaded as at 69 and meshes with internal threads in the hollow shaft 59. The extreme end of the shaft 68 extends from the end of the hollow shaft 59 so that it can seat against the end of the tapped opening 63 and thereby bind or exert pressure on the threaded portions of the hollow shaft 59, tapped opening 63 and internal threads in engagement with the shaft threads 69. To unlock the carriage, the knob 31 is rotated in a direction to retract the shaft 68 within the hollow shaft 59 so that the hollow shaft 59 can then be rotated by the knob 30 to effect movement of the carriage 64.

In the cross section of FIG. 3, the relative positions of the various components described thus far with respect to FIG. 2 will be evident.

Figure 4:
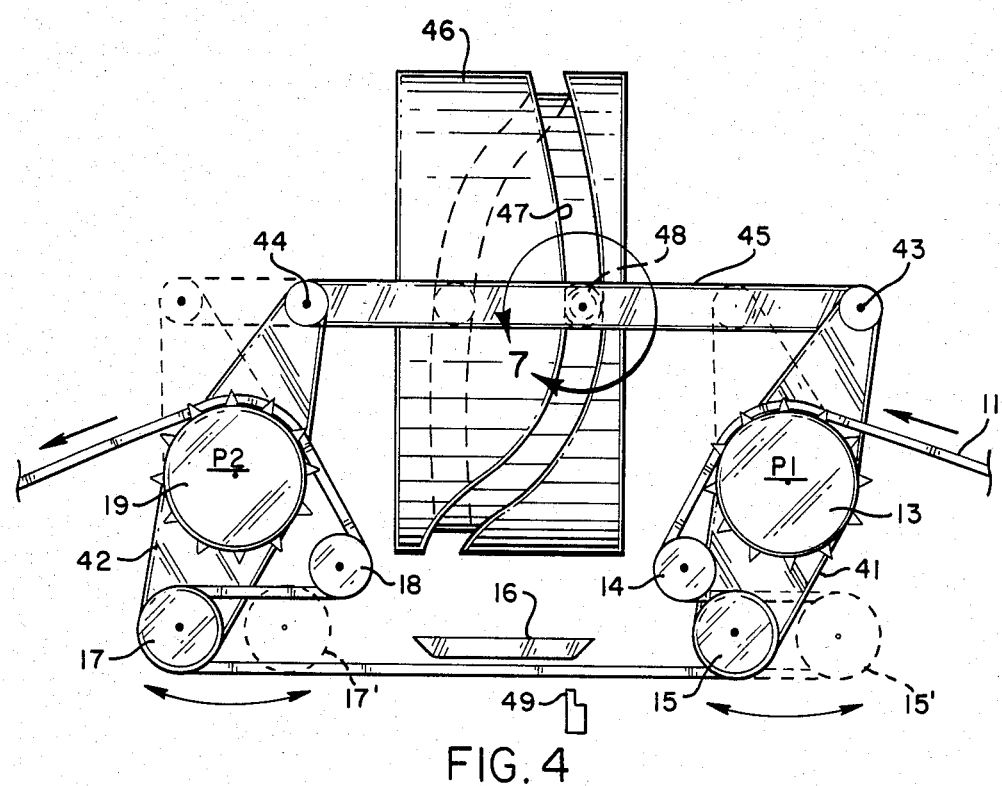
FIG. 4 is another broken away plan view schematic in nature illustrating the basic components of FIG. 1 useful in explaining the operation of the invention.

FIG. 4 is a schematic plan view of the essential components for effecting the desired film movement as described with respect to FIGS. 1, 2 and 3. In FIG. 4, the rollers 15 and 17 are shown in one extreme position corresponding to the situation where a new frame of the film has just been transported into the gate 16. At the position illustrated in FIG. 4, the registration pin means schematically indicated at 49 would now enter the film perforations to hold the film in its dwell position in the gate 16. The rollers 15 and 17 will then be moved from left to right as viewed in FIG. 4 towards the dotted line positions 15' and 17' by arcuate swinging of the arms 41 and 42 about the pivot points P1 and P2. As described, this motion is imparted by movement of the cam follower 48 within the channel 47 of the drum 46.

Movement of the roller 15 to the right will necessarily take up film 11 constantly being fed to it by the first sprocket 13. Similarly, movement of the roller 17 to the right as viewed in FIG. 4 will release film which is constantly being taken up by the second sprocket 19. Thus, the film in the gate 16 is essentially stationary until such time as the rollers 15 and 17 reverse movement along a return path to their original starting points.

It can easily be visualized in FIG. 4 that as the rollers 15 and 17 move from their dotted line positions 15' and 17' to the left towards the solid line positions, the roller 17 will pull film very rapidly through the gate 16 since the sprocket 19 is constantly turning in a counterclockwise direction to take up film from the roller 17. This accelerated movement of the film through the gate 16 will be accommodated by the movement of the roller 15 from right to left as viewed in FIG. 4 and the film being supplied by the constant rotation of the sprocket 13.

The basic concept involved is to effect movement of the rollers in unison along a given path for a first given period during which the first roller takes up all film fed to it and the second roller releases all film taken from it and for moving the first and second rollers in unison along a return path to their original positions during a second given period less than the first given period whereby film in the gate is stationary during the first given period and moved through the gate from one frame to the next within the second given period.

By utilizing roller support means in the form of the pivoting arms 41 and 42, the motion of the rollers is arcuate as indicated by the double headed arcuate arrows in FIG. 4. It is possible, however, to provide for absolutely rectilinear motion of the rollers 15 and 17.

Figure 5:
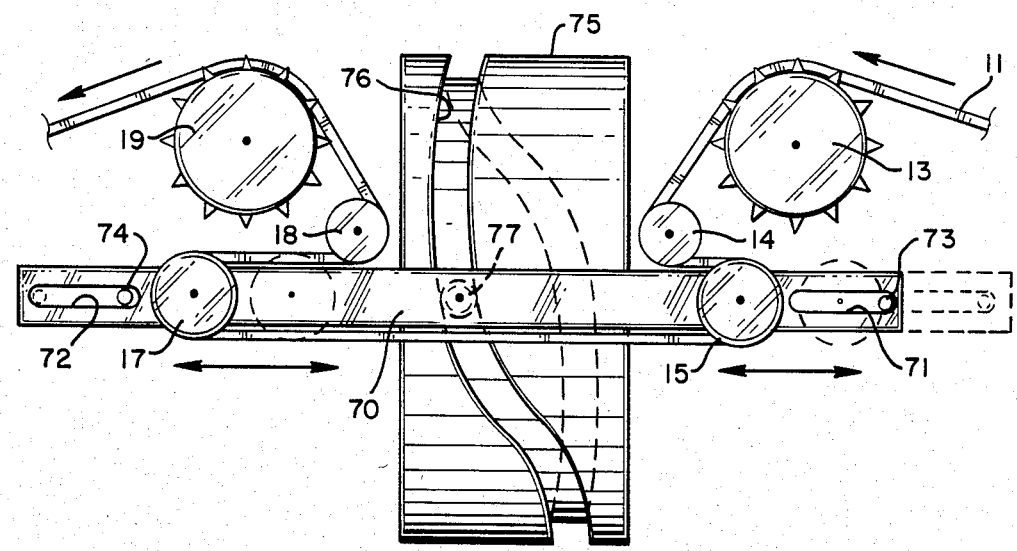
FIG. 5 shows a modified construction to that illustrated in FIG. 4.

FIG. 5 shows a roller support system wherein the rollers 15 and 17 will move from left to right in exact rectilinear directions as indicated by the straight double-headed arrows. In FIG. 5, rather than pivoted arms, there is provided a straight arm member 70 having the rollers 15 and 17 rotatably mounted on opposite ends. Arm 70 continues past the rollers to define straight slots 71 and 72 receiving stationary pins 73 and 74. These stationary pins received within the slots 71 and 7Z serve to guide left and right movement of the arm to a rectilinear path.

Disposed beneath the arm 70 is a drum 75 provided with a camming channel 76 receiving a cam follower 77 on the arm 70. As the drum rotates, the arm 70 will be moved back and forth between the solid and dotted line positions as shown.

In all of the embodiments described thus far, the stationary guide rollers 14 and 18 serve to position the direction of the film so as to be in alignment generally with the direction of motion of the rollers 15 and 17. These guide rollers thus permit proper spacing of the sprockets from the action of the rollers and assure that the film is consistently received and released in a direction generally parallel to the motion of the rollers, even though the rollers change positions relative to the sprockets 13 and 19.

Since the rotation of the sprockets 13 and 19 is constant, the rollers 15 and 17 in moving from left to right as viewed in FIG. 5 would travel at a constant linear velocity in order to take up all film fed to it by the sprocket 13.

In the case of the rollers in the embodiment of FIG. 4 which follow a slight arcuate path, it will be evident that they would not follow an exact constant velocity if they are to take up all film fed by the sprocket 13. However, the arcuate movement is so slight that only a very small adjustment in the velocity need be effected and such can be done by appropriately changing slightly the path of the camming channel 47. In other words, the path of the camming channel would be slightly varied to compensate for the slight arcuate movement so that it is assured that all film fed by the sprocket 13 is taken up by the roller 15.

Figure 6:
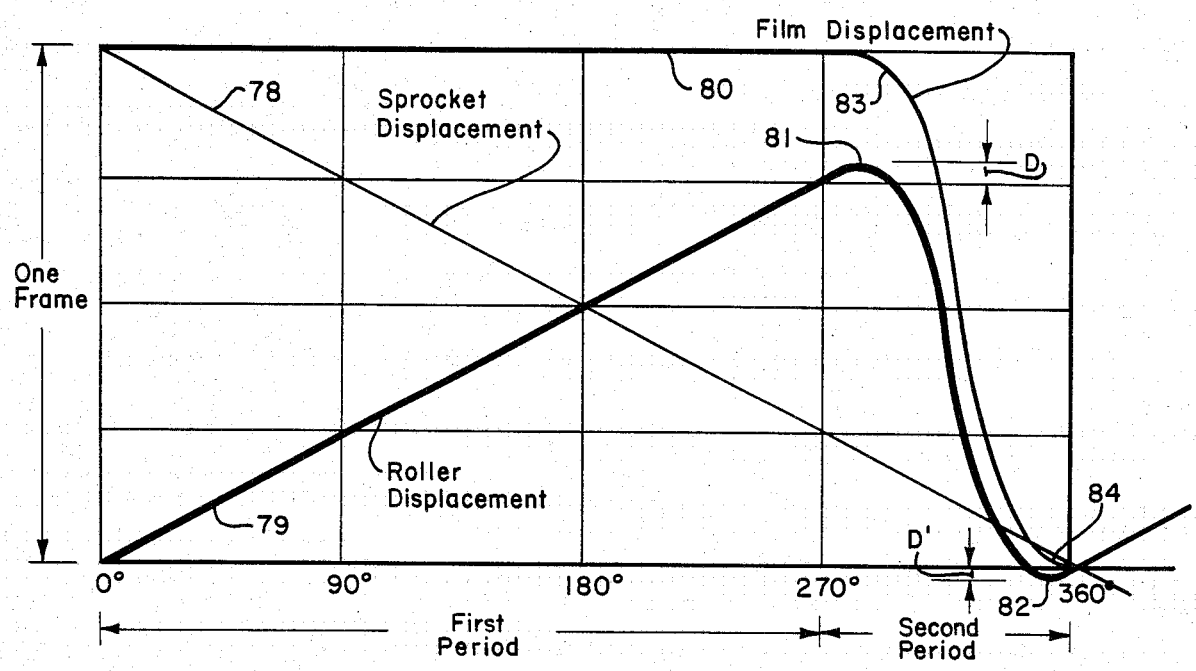
FIG. 6 is a plot illustrative of the movement of various components during a single cycle of operation.

All of the foregoing action will be still further better understood by referring now to the diagram of FIG. 6. In FIG. 6 the sprocket displacement; that is, the constant feeding and taking up of film by the sprockets 13 and 19 respectively is indicated by the straight line 78 sloping from the upper left to the lower right over a 360° cycle. The roller displacement, on the other hand, is indicated by the line 79 which slopes upwardly over a first given period representing the constant speed of movement of the rollers during the dwell time of the film and return of the rollers during a second period to their original positions during the film transport period.

The top line 80 indicates the film displacement. It will be seen that the line 80 shows zero film displacement over the first 270°, the roller displacement taking up all film fed to it as a consequence of the sprocket rotation. Thereafter, in the second period, the film is transported a complete frame. The cycle then starts over at the 360° point.

It is to be noted that the roller displacement as already described can be carefully controlled by the path of the camming channel in the drum. This path is so designed as to assure that there will be a gradual and smooth acceleration of the rollers at the beginning of the second period as indicated at 81 and a gradual and smooth deceleration of the rollers at the end of the second period as indicated at 82. Also, it will be noted that there is a slight overshoot indicated by the distance D after the rollers have reached the 270° mark so that the smoothly desired acceleration can take place without any abrupt changes in the roller displacement and without interfering with the straight line portion of the roller displacement curve 79 between zero degrees and 270°. Similarly, there is a slight overshoot indicated by the distance D' to provide for the smooth deceleration at 82.

The film displacement in turn which is controlled by movement of the rollers is smoothly accelerated and decelerated as indicated at 83 and 84 so that minimum stress is placed on the film perforations.

Figure 7:
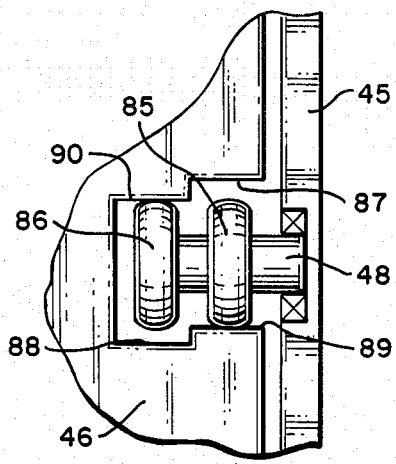
FIG. 7 is a fragmentary elevational view of that portion of FIG. 4 enclosed within the circular arrow 7.

Referring now to FIG. 7, there is illustrated in more detail the cam follower 48 described in FIG. 4. In order to prevent any disengagement of the cam follower with the sides of the channel, the cam follower is made up of first and second wheels 85 and 86 in coaxial relationship, each independently rotatable on a common shaft. The camming channel for the drum 46, in turn, has its opposite sides relieved at portions juxtaposed to the wheels as at 87 and 88 respectively so that the unrelieved portions 89 and 90 of the opposite sides are always respectively engaged by the wheels 85 and 86.

Figure 8:
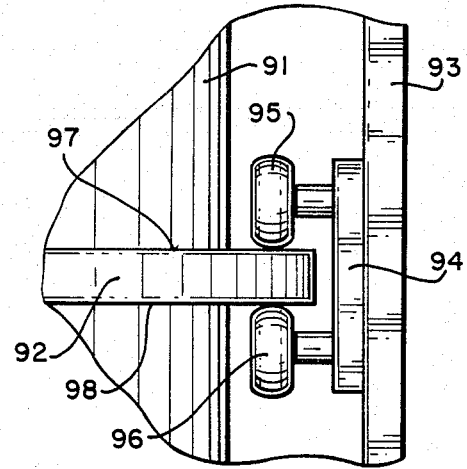
FIG. 8 is a view similar to FIG. 7 but showing a modified construction.

FIG. 8 shows an alternative camming arrangement wherein there is provided a drum 91 having a rib 92 radially extending from the periphery of the drum as shown. A roller support link 93 similar to the link 45 carries a cam follower 94 comprised of a pair of wheels 95 and 96 respectively engaging opposite surfaces 97 and 98 of the rib 92. Upon rotation of the drum, these wheels will thus follow the rib and effect the desired movement of the roller support in a plane parallel to the axis of the drum.

Figure 9:
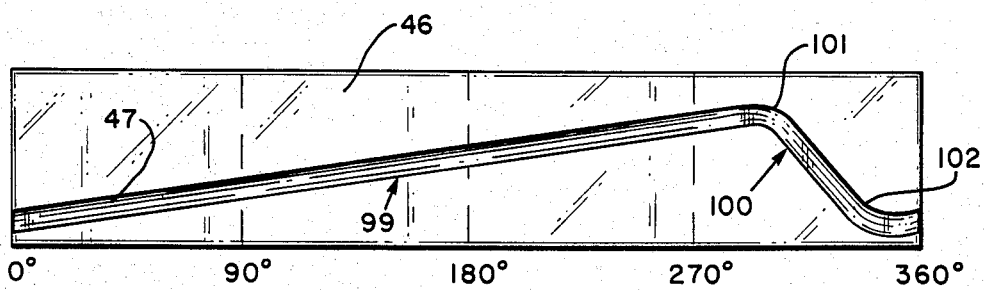
FIG. 9 is a layout of a camming drum used in the apparatus shown in FIGS. 2 and 4.

FIG. 9 shows a layout for the drum 46 wherein the path of the camming channel 47 will be clear. Essentially, the channel follows a first helical path 99 extending more than 180° about the periphery of the drum at a given pitch. In FIG. 9, the actual extent at a constant given pitch is between zero degrees and 270°. Thereafter, the end of the first helical path 99 smoothly curves into a second path 100 extending less than 180° about the periphery of the drum and of a variable pitch of average value greater than the given pitch and in an opposite direction, the end of the second path smoothly curving into the initial end of the first helical path. The path of the camming channel 47 thus follows essentially the roller displacement line 79 described in FIG. 6. It is to be noted that at the curved portions of the camming channel such as 101 and 102, the cam follower wheels 85 and 86 described in FIG. 7 will maintain engagement with the opposite walls because of their coaxial arrangement. On the other hand, if a rib such as rib 92 were used in place of the channel 47, such as the rib 97 of FIG. 8, the rib would be narrowed slightly at its curved portions so that the cam follower wheels 95 and 96 described in FIG. 8 will maintain engagement with the camming surfaces without interference.

The reason for the variations in the thickness of the rib when traversing a curve is that the cam follower wheels must remain in a given orientation with each other as they move back and forth. In other words, they cannot angularly accommodate the curve.

As stated, in the particular preferred embodiments under consideration, there is provided a dwell time of approximately 270° for each film frame in the film gate.

Figure 10:
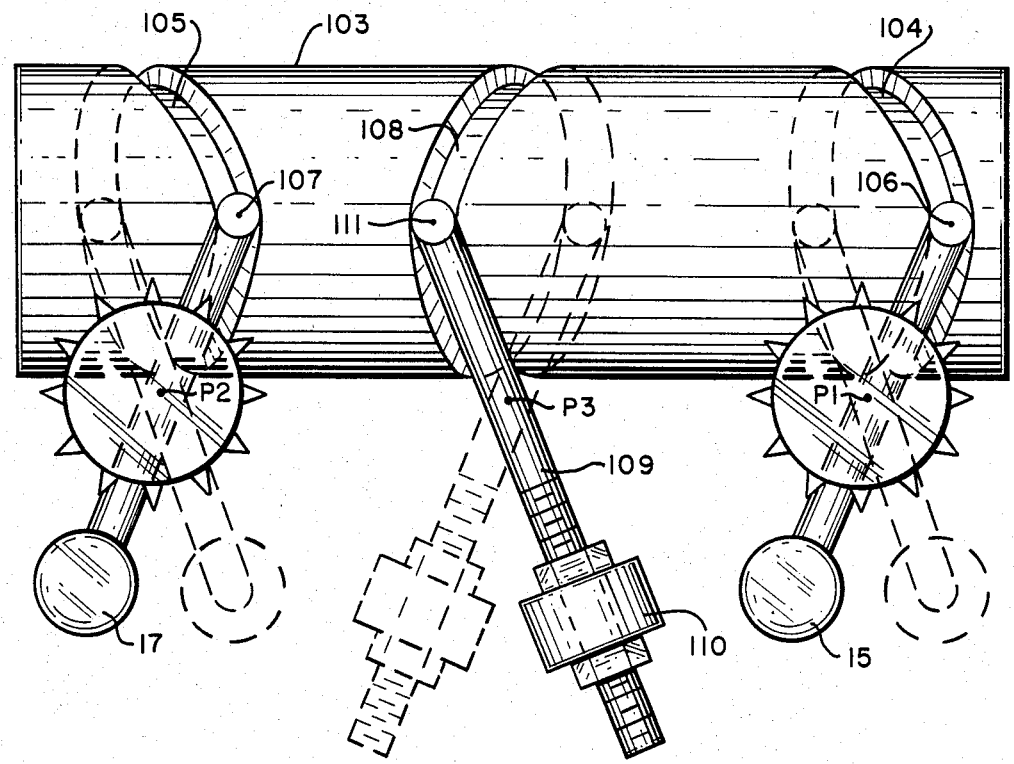
FIG. 10 is a schematic plan view of a further modification of the present invention.

Referring now to FIG. 10, there is shown a modified drum and cam follower arrangement for movement of the first and second rollers 15 and 17 by way of arms pivoted at points P1 and P2. In this embodiment, there is provided an elongated drum 103 having first and second camming channels 104 and 105 cut therein for receiving cam followers 106 and 107 at the ends of the arms for the rollers 15 and 17 respectively. The cam channels 104 and 105 are identical and displaced along the axis of the drum 103 by the same distance as the pivot points P1 and P2. In this respect, the cam channels 104 and 105 will follow the layout described in FIG. 9.

In addition to the first and second cam channels 104 and 105, there is provided a third camming channel 108 and a third arm 109 pivoted at a point P3 intermediate its ends between the pivot points P1 and P2. Arm 109 carries at its extending end a counterweight 110 and at its end opposite the extending end a cam follower 111 received in the third camming channel 108. The third camming channel 108 is a mirror image of the first camming channel 104 and second camming channel 105 so that the counterweight 110 is moved in an opposite direction to the movement of the rollers 15 and 17, all as depicted by the phantom lines. By this arrangement, there is provided dynamic balancing for movement of the rollers so that vibrations are minimized.

Equivalent dynamic balancing arrangements could be provided. For example, a center camming channel could be used to move a link which in turn would rock arms carrying the rollers as in previous embodiments. Mirror image camming channels could then be formed on either side of the central camming channel on the same drum, these outer camming channels having arms and counterweights which move in opposite directions to the rollers to again provide dynamic balancing. In a very simplified version, there might be provided only one mirror image camming channel for movement of the counterweight and one normal channel for movement of both rollers.

Figure 11:
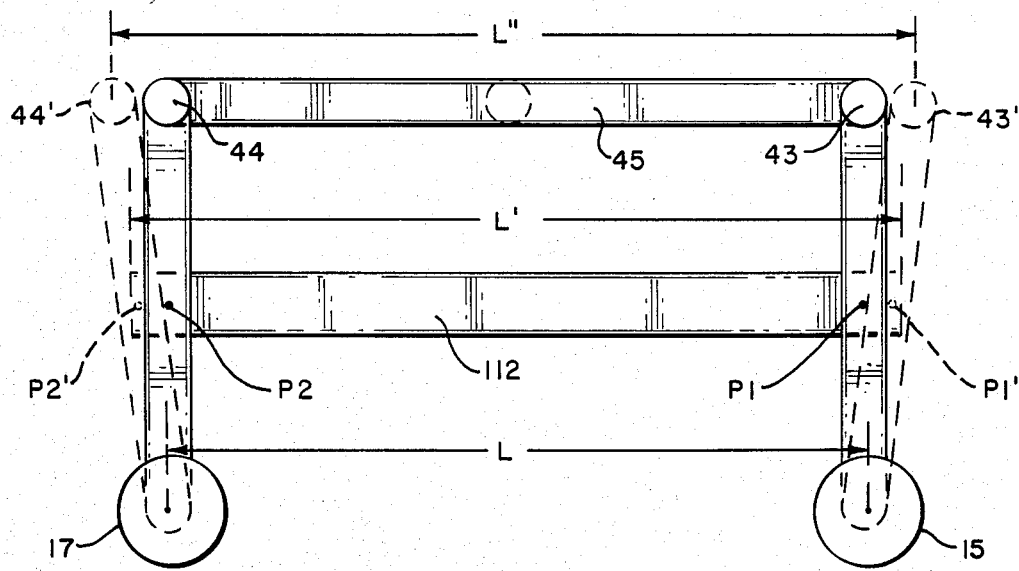
FIG. 11 is a highly schematic view of certain components useful in explaining temperature compensation features of the invention; and, FIG. 12 is another perspective view similar to FIG. 1 of the apparatus schematically illustrating a cooling system.

FIG. 11 shows a further feature of this invention wherein temperature compensation is provided to avoid any variation in the distance between the first and second rollers 15 and 17 as a consequence of temperature changes. In other words, it is critical that the distance between the rollers 15 and 17 remain constant.

A portion of the frame or housing 10 described in FIGS. 1 and 2 and indicated at 112 in FIG. 11 mounts the first and second sprockets depicted by faint circles about the pivot points P1 and P2. This portion 112 of the housing 10 is of a material having a first given coefficient of thermal expansion.

The link 45, on the other hand, connecting the ends 43 and 44 of the arms opposite the extending ends of these arms mounting the rollers is of a material having a second given coefficient of thermal expansion. The coefficients of thermal expansion for the structural portion 112 and the link 45 are such that the thermal expansion of the link 45 is twice that of the portion of the frame 112 so that the rollers 15 and 17 will always remain the same distance apart under different temperature conditions.

In order that the foregoing be realized, the pivot points P1 and P2 must be midway on the roller supporting arms. As a specific example, assume that the length of the structural portion 112 between the pivot points P1 and P2 is L and that the length increases to the dimension L' as a consequence of increasing temperature. The corresponding thermal expansion or increase in the link 45 will be twice that amount to a dimension L''. Since the pivot points P1 and P2 are in the middle of the extending ends of the arms, the rollers 15 and 17 will necessarily remain exactly the same distance apart when the pivot points are at positions P1' and P2' separated by a distance L', notwithstanding the change in temperature. The new expanded position under heated conditions for the portion 112 and link 45 is depicted by the dotted lines in FIG. 11.

Figure 12:
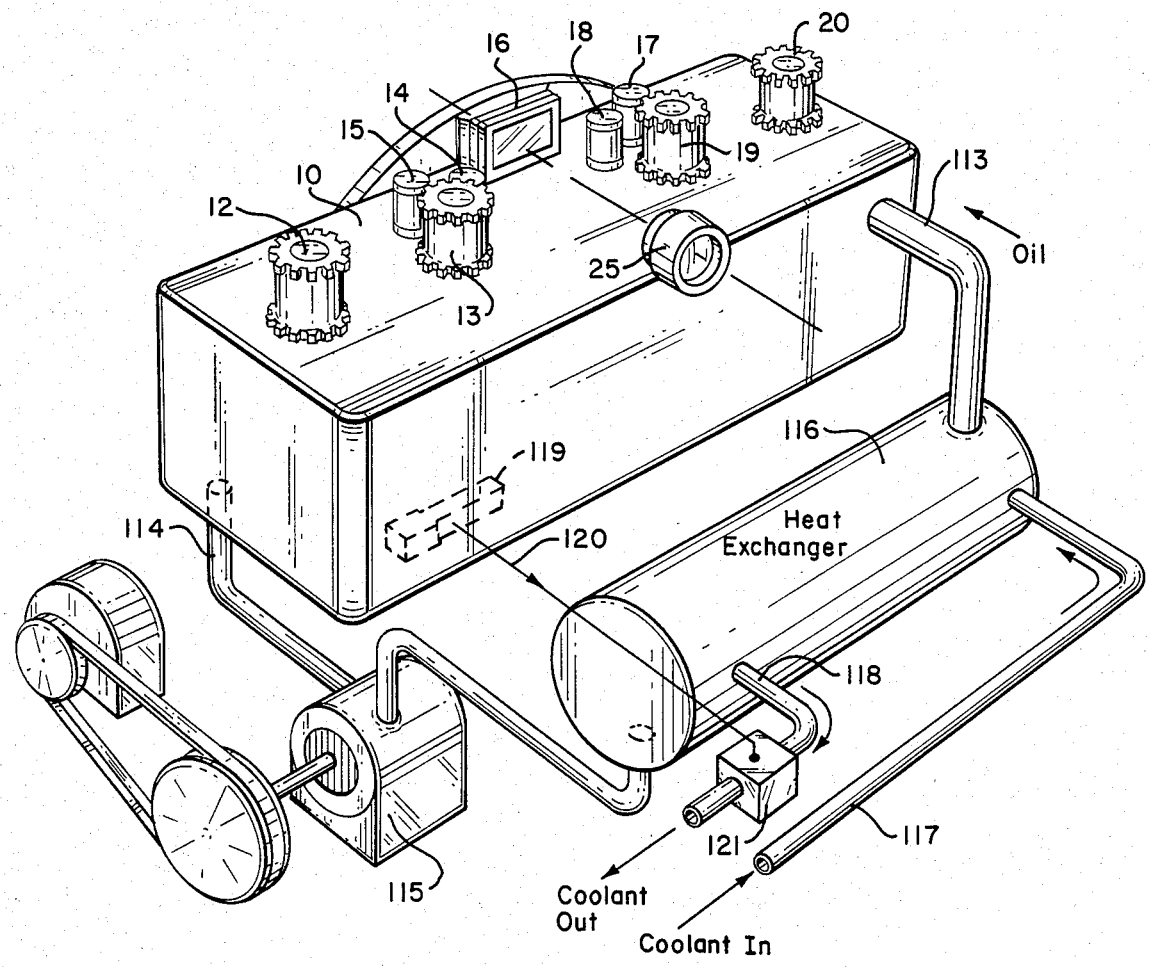

FIG. 12 illustrates a cooling system for the entire apparatus. The object of the cooling system is to permit the use of a very high viscosity lubricating oil within the housing to dampen vibrations. Since the oil would rapidly heat up during operation, it would lose its high drag resistance to the moving parts since with increasing temperature, the viscosity would decrease. Thus, its damping capability would be impaired. However, by utilizing an appropriate cooling system, the oil temperature can be kept at a value so that it will not lose its high viscosity and thereby efficiently reduce vibrations under prolonged operating conditions.

With specific reference to FIG. 12, the oil enters into the housing at 113 and exits from the housing at 114. A pump 115 circulates the oil from its exit 114 into a heat exchanger 116 and into the entrance 113. Heat exchanger 116 is arranged to receive a coolant along an inlet 117, this coolant passing down the heat exchanger in an opposite direction to the oil flow and exiting through an outlet 118. A sensor or thermostat indicated in phantom lines at 119 within the housing 10 is provided for controlling by way of a line 120 a valve 121 in the cooling conduit 118. By varying this valve, the rate of coolant flow through the heat exchanger can be regulated to thereby control the degree of cooling of the oil. The coolant is preferably pre-cooled water.

From all of the foregoing, it will be evident that the present invention has provided a greatly improved motion picture film movement apparatus. It will be understood as mentioned repeatedly heretofore that any deviations of the roller movement from a rectilinear path as a result of the pivoting of the arms as opposed to the arrangement of FIG. 5, can be corrected by slight modifications to the path of the camming channel. Thus, a strictly constant pitch over the 270° would not be provided but rather a slight variation to take into account the slight arcuate movement of the rollers. This variation will assure that the first roller accepts all film fed to it by constant rotation of the first sprocket and the second roller releases all film taken up by the second sprocket. The terms "constant pitch" and "given pitch" are thus to be interpreted as encompassing such slight variations to compensate for arcuate movement where pivot arms are employed.

It will be understood that for all of the various helical gears described in FIGS. 2 and 3, for example, there are provided double thrust bearings to accommodate axial loading on these gears.

Various changes falling clearly within the scope and spirit of this invention will occur to those skilled in the art. The motion picture film movement apparatus, accordingly, is not to be thought of as limited to the specific embodiment set forth for illustrative purposes.

I claim:

1. An apparatus for intermittently moving film through a film gate in a manner to provide a dwell time for each film frame, greater than one-half the period of a complete cycle, comprised of the dwell time and the transport time involved in moving the film from one frame to the next, said apparatus including, in combination:
   (a) first and second rollers;
   (b) means for feeding film to said first roller and taking up film from said second roller including a first sprocket wheel about which film to be fed to said first roller passes, a second sprocket wheel of the same size as said first sprocket wheel about which film taken up from said second roller passes and means for rotating said sprocket wheels at equal constant rates;
   (c) first and second arms;
   (d) means pivoting said arms at first and second pivot points coinciding respectively with the axes of rotation of said first and second sprocket wheels, extending ends of said arms mounting said rollers so that back and forth swinging movement of said arms moves said rollers along arcs defining a given path and a return path;
   (e) a rotatable member having a camming means on its periphery following a direction constituting a function of the rate of movement of the rollers along said given path and return path; and
   (f) a cam follower connected to the ends of said first and second pivot arms opposite the extending ends on the other side of said pivot points movable by said camming means in a repititive pattern in response to rotation of said member, said first and second rollers being rocked back and forth by action of said cam follower in unison along said given path for a first given period during which the first roller takes up all film fed to it and the second roller releases all film taken from it and in unison along a return path to their original positions during a second given period less than said first given period whereby film in said film gate is stationary during said first given period and moved through said gate from one frame to the next within said second given period.

2. An apparatus according to claim 1, in which acceleration of said rollers at the beginning of said second given period is smoothly effected and deceleration of the rollers at the end of said second given period is smoothly effected to thereby relieve stress on the film perforations.

3. An apparatus according to claim 1, in which said rotatable member comprises a drum, said camming means constituting a channel cut radially inwardly on the periphery of the drum and following a first helical path extending more than 180° about the periphery of the drum at a given pitch, the end of said first helical path smoothly curving into a second path extending less than 180° about the periphery of said drum and of a variable pitch of average value greater than said given pitch and in an opposite direction, the end of said second path smoothly curving into the initial end of the first helical path, said cam follower means being receivable in said channel so that upon rotation of the drum, the cam follower means is moved in a plane parallel to the axis of the drum.

4. An apparatus according to claim 3, in which said cam follower means includes a pair of coaxial wheels in end-to-end relationship, the opposite sides of said channel being relieved at portions juxtaposed to the wheels respectively so that the unrelieved portions of the opposite sides are always respectively engaged by the wheels.

5. An apparatus according to claim 3, in which said drum includes a further channel following a path constituting a mirror image of said first mentioned channel as viewed in a direction normal to the axis of said drum; a third pivot point in alignment with said first and second pivot point; a third arm pivoted at said third pivot point and having an extending end terminating in a counterweight; and a further cam follower connected to the end of said third arm opposite said extending end on the other side of said third pivot, receivable in said further channel, whereby said weight moves in directions opposite to the rollers to thereby provide dynamic balancing of the motion of the rollers when the drum is rotating rapidly.

6. A captive film loop apparatus for intermittently moving film through a film gate in a manner to provide a dwell time for each film frame greater than one-half the period of a complete cycle comprised of a dwell time and transport time involved in moving the film from one frame to the next, said apparatus including, in combination:
   (a) a housing structure supporting said film gate;
   (b) a first sprocket rotatably mounted to said structure for feeding film at a constant rate for passing into said film gate;
   (c) a second sprocket rotatably mounted to said structure for taking up film at a constant rate exiting from said film gate;
   (d) a first roller positioned to receive film from said first sprocket before said film passes into said film gate;
   (e) a second roller positioned to receive film from said film gate before the film is taken up by said second sprocket;
   (f) a rotatable member in said housing and having a camming means on its periphery;
   (g) arm means including first and second arms supporting said first roller and said second roller;
   (h) means pivoting corresponding intermediate points on said arms to said first and second pivot points coinciding with the axes of rotations of said first and second sprockets, said first and second arms having extending ends mounting said rollers so that back and forth swinging movement of said arms moves said rollers along a given path and a return path;

(i) a cam follower including a link connected to the ends of said arms opposite said extending ends on the opposite sides of said pivot points and responsive to said camming means for moving said arms means to thereby move said rollers in unison along said given path for a first given period during which said first roller takes up all film fed to it by said first sprocket and the second roller releases all film taken from it by said second sprocket and for moving said first and second rollers in unison along said return path to their original positions during a second given period less than said first given period, whereby film in said film gate is stationary during said first given period and moved through said gate from one frame to the next within said second given period.

7. An apparatus according to claim 6, including film separation sprockets positioned respectively to feed film to said first sprocket and receive film from said second sprocket; and idler gears connecting said film separation sprockets to said first and second sprockets for simultaneous rotation therewith whereby a loose film length can be maintained between said first sprocket and one of the film separation sprockets and a loose film length maintained between said second sprocket and the other of said film separation sprockets.

8. An apparatus according to claim 6, including a drive shaft passing through said housing structure and carrying said rotatable member; motor means for rotating said shaft; first drive gear means for rotating said first sprocket from said drive shaft; second drive gear means for rotating said second sprocket from said drive shaft; and film positioning means individually associated with said first and second drive gear means for enabling the position of the film in said film gate to be adjusted without having to change the position of said rotatable member.

9. An apparatus according to claim 6, in which the portion of said housing between said first and second sprockets has a given coefficient of thermal expansion and in which said link has a second given coefficient of thermal expansion such that the thermal expansion of said link is twice that of said portion of said housing so that said rollers remain the same distance apart under different temperature conditions.

10. An apparatus according to claim 6, including means for circulating oil through said housing; and heat exchange means exterior of said housing through which said oil passes to remove heat from said oil.

11. An apparatus according to claim 6, including first and second guide rollers in fixed positions relative to said first and second sprockets, said first guide roller receiving film from said first sprocket to feed said film to said first roller in a direction parallel to movement of the roller, said second guide roller receiving film from said second roller in a direction parallel to the direction of movement of the second roller for taking up the film to said second sprocket.

12. An apparatus according to claim 6, in which said first given period constituting the dwell time of said film is approximately $\frac{3}{4}$ and the second given period constituting the time said film is transported is approximately $\frac{1}{4}$ of the total time made up of the dwell time and the transport time of said film.

* * * * *